United States Patent
Lee

(10) Patent No.: US 11,232,422 B2
(45) Date of Patent: Jan. 25, 2022

(54) PERFORMING PAYMENT PROCESS ACCORDING TO USE OF IMAGE FORMING APPARATUS IN ELECTRONIC DEVICE

(71) Applicant: Hewlett-Packard Development Company, L.P., Spring, TX (US)

(72) Inventor: Hyun Suk Lee, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/049,414

(22) PCT Filed: Dec. 18, 2018

(86) PCT No.: PCT/KR2018/016081
§ 371 (c)(1),
(2) Date: Oct. 21, 2020

(87) PCT Pub. No.: WO2020/040362
PCT Pub. Date: Feb. 27, 2020

(65) Prior Publication Data
US 2021/0241244 A1    Aug. 5, 2021

(30) Foreign Application Priority Data
Aug. 21, 2018    (KR) .......................... 10-2018-0097697

(51) Int. Cl.
*G06Q 20/14* (2012.01)
*G06Q 20/32* (2012.01)
*H04N 1/00* (2006.01)

(52) U.S. Cl.
CPC ......... *G06Q 20/145* (2013.01); *G06Q 20/326* (2020.05); *G06Q 20/3274* (2013.01); *H04N 1/00244* (2013.01); *H04N 1/00408* (2013.01); *H04N 1/00938* (2013.01); *H04N 2201/0094* (2013.01)

(58) Field of Classification Search
None
See application file for complete search history.

(56) References Cited

U.S. PATENT DOCUMENTS 7,636,757 B2    12/2009    Kemp et al.
2003/0095283 A1    5/2003    Nakajima
(Continued)

*Primary Examiner* — Frantz Bataille
(74) *Attorney, Agent, or Firm* — Jefferson IP Law, LLP

(57) ABSTRACT

An electronic device and an operating method of an electronic device are provided. The operating method includes obtaining first policy information including device information of a first image forming apparatus and information of a payment process with respect to the first image forming apparatus, preparing one or more applications used for driving the first image forming apparatus or used for the payment process, based on the first policy information, receiving a request for a first job of the first image forming apparatus and generating, based on the first policy information, first charging information corresponding to the first job, calling a first application from among the one or more applications used to pay a first payment amount based on the first charging information, and, when the first payment amount is paid via the first application, controlling the first image forming apparatus to perform the first job.

20 Claims, 11 Drawing Sheets

(56) References Cited

U.S. PATENT DOCUMENTS

| | | | |
|---|---|---|---|
| 2013/0080289 A1* | 3/2013 | Roy | G06Q 20/204 |
| | | | 705/26.8 |
| 2013/0085968 A1 | 4/2013 | Schultz et al. | |
| 2013/0226695 A1 | 8/2013 | Tamari | |
| 2014/0114782 A1 | 4/2014 | Cloin et al. | |
| 2014/0355063 A1 | 12/2014 | Jang et al. | |
| 2015/0237207 A1 | 8/2015 | Ordille et al. | |
| 2016/0055477 A1 | 2/2016 | Guerin et al. | |
| 2017/0070642 A1 | 3/2017 | Miyamoto et al. | |
| 2017/0337016 A1* | 11/2017 | Lee | G06Q 20/18 |
| 2018/0213116 A1* | 7/2018 | Sun | H04N 1/32122 |

* cited by examiner

[Fig. 1]
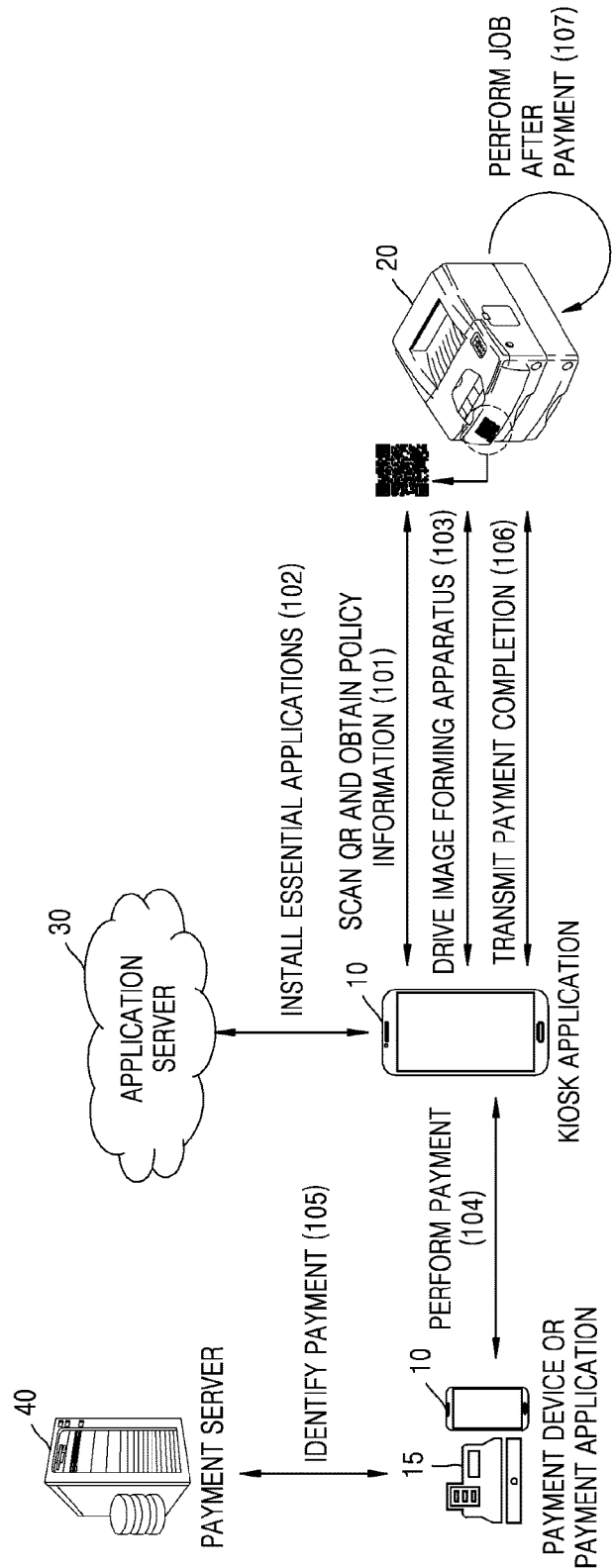

[Fig. 2]
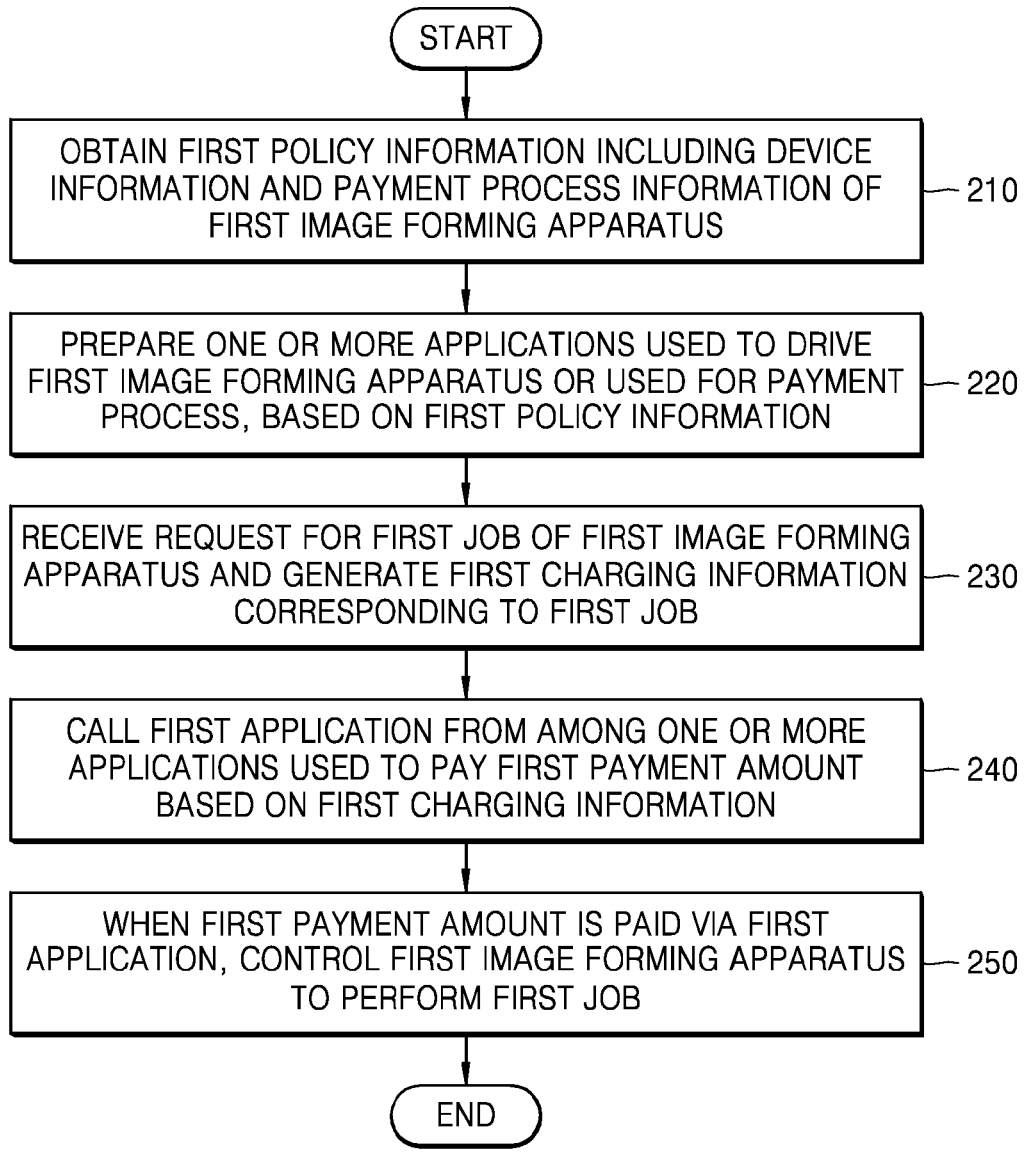

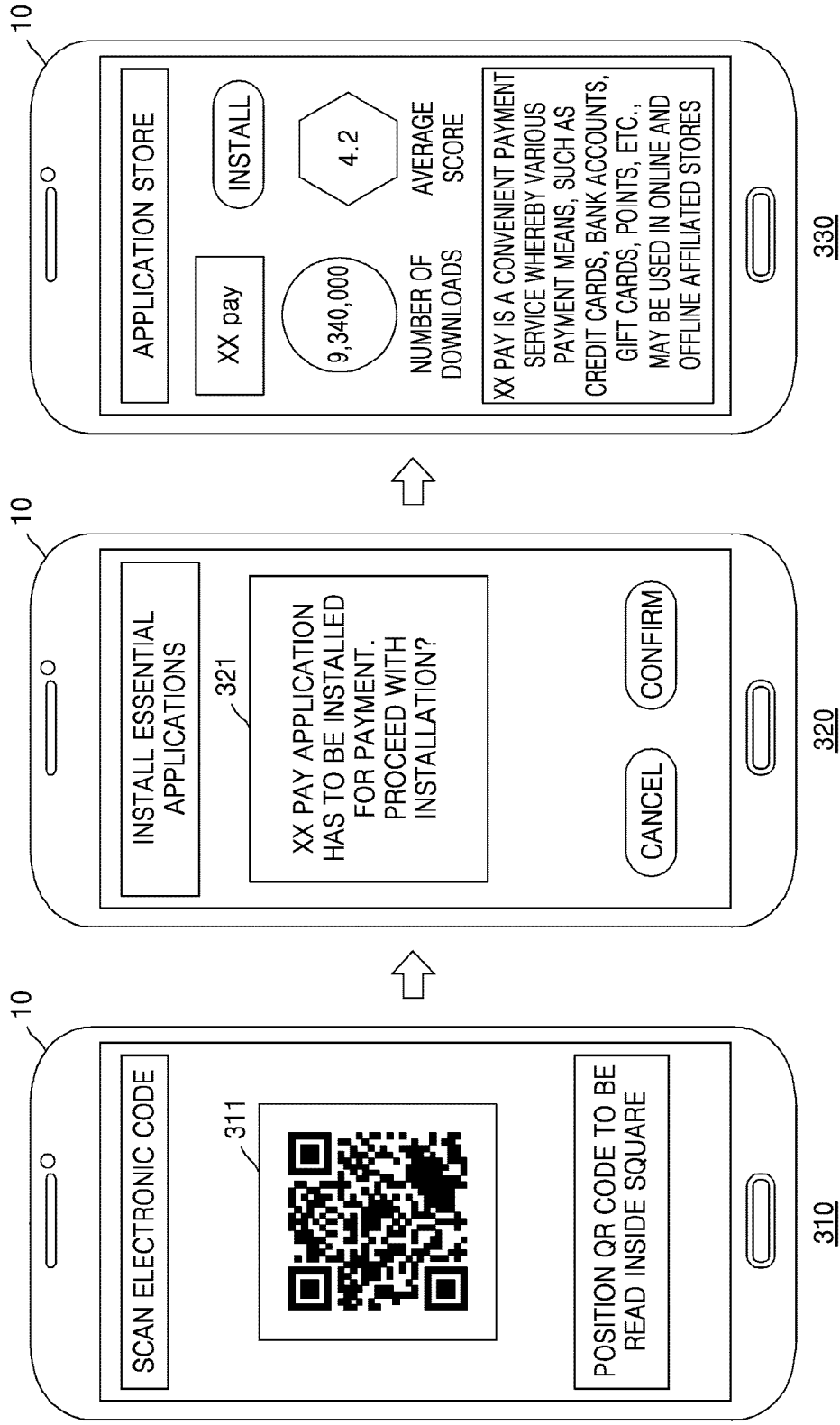
[Fig. 3]

[Fig. 4]
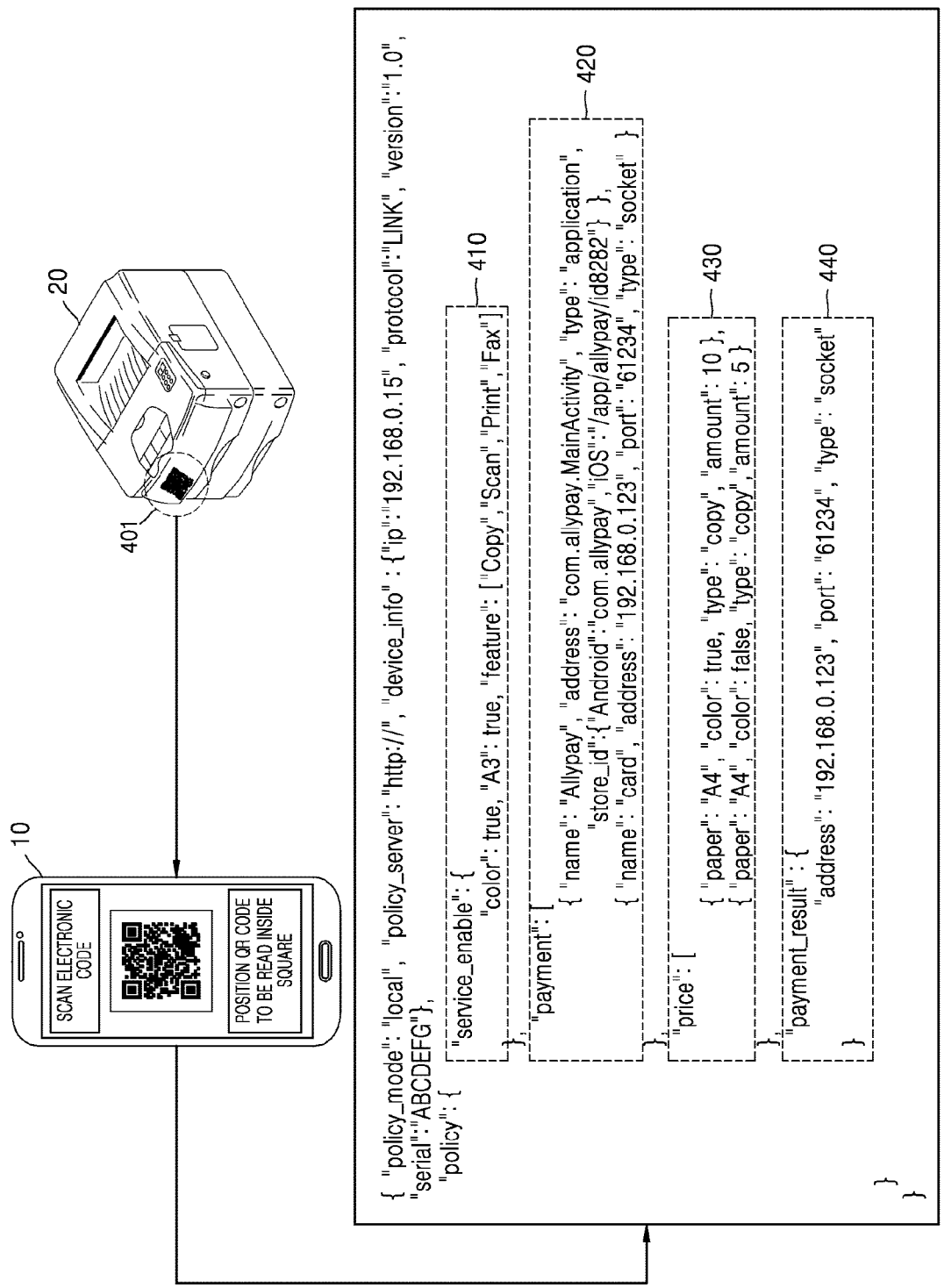

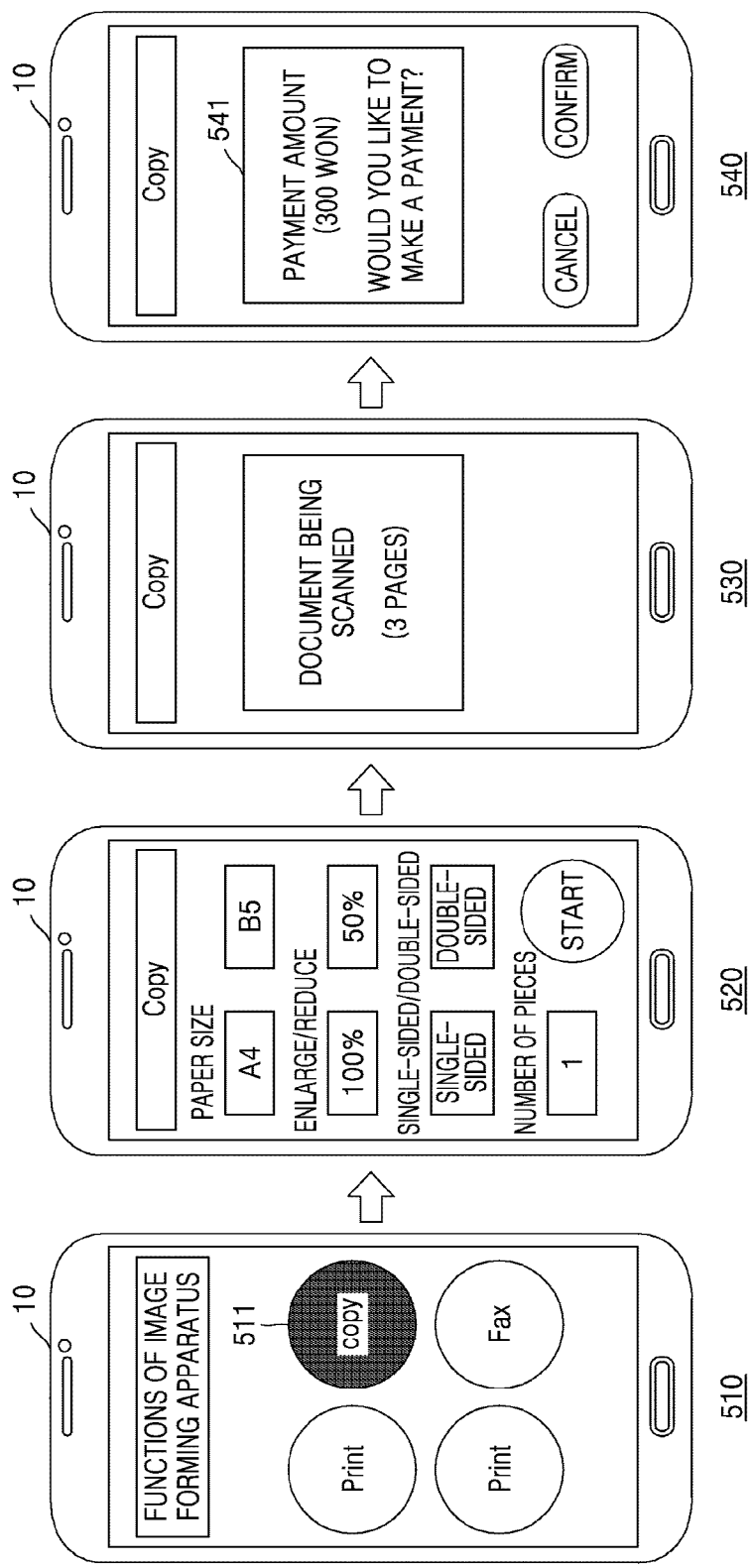

[Fig. 6]
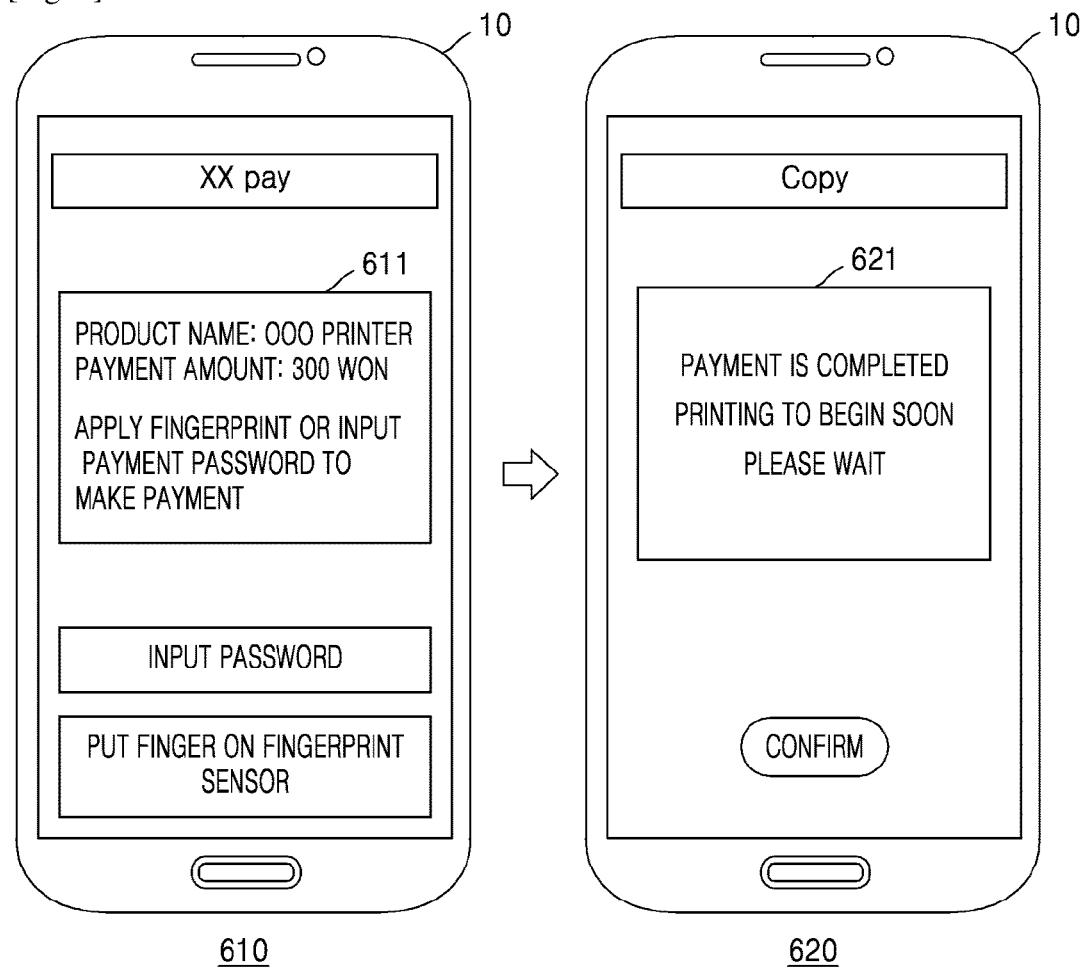

[Fig. 7]
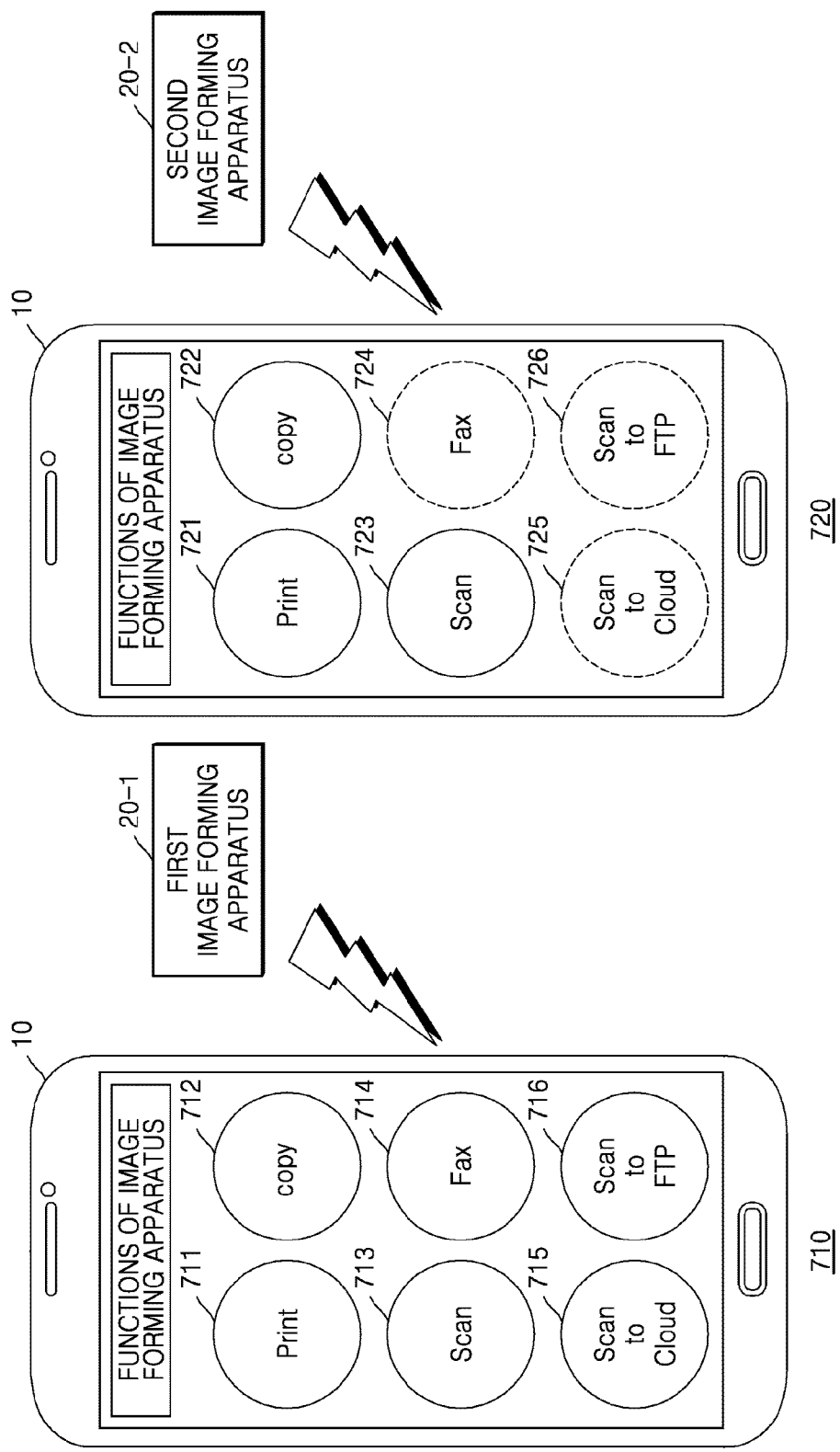

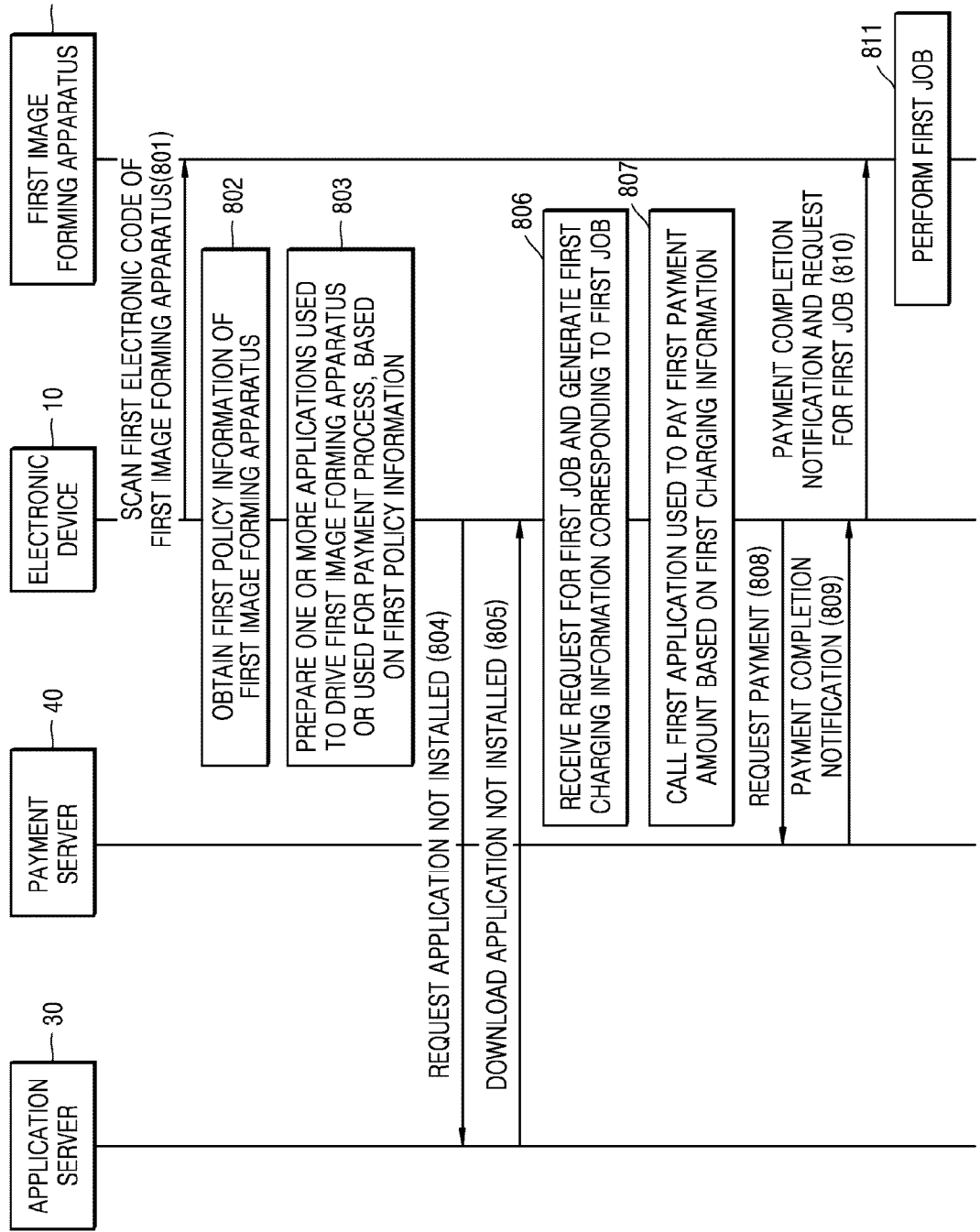
[Fig. 8]

[Fig. 9]
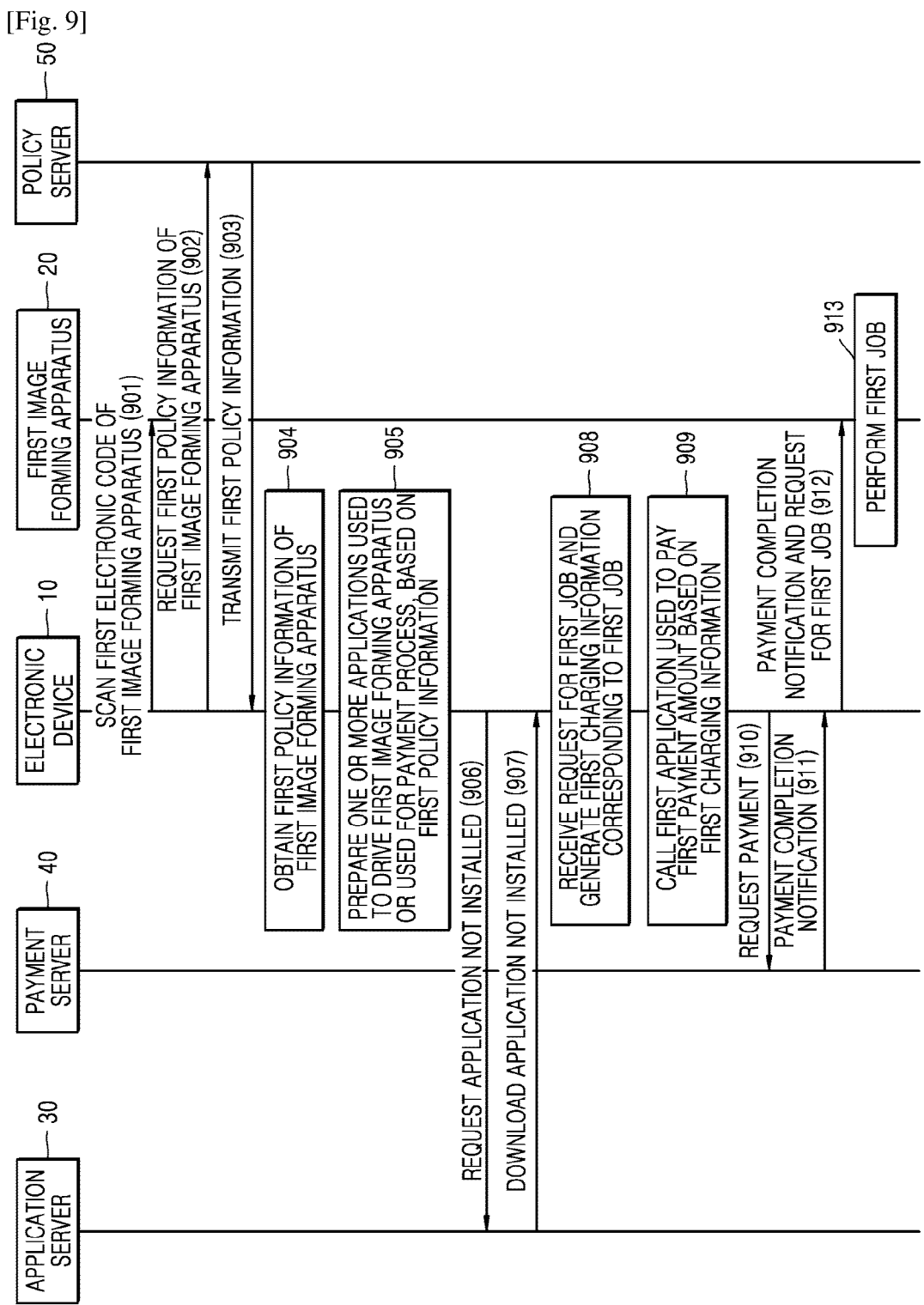

[Fig. 10]
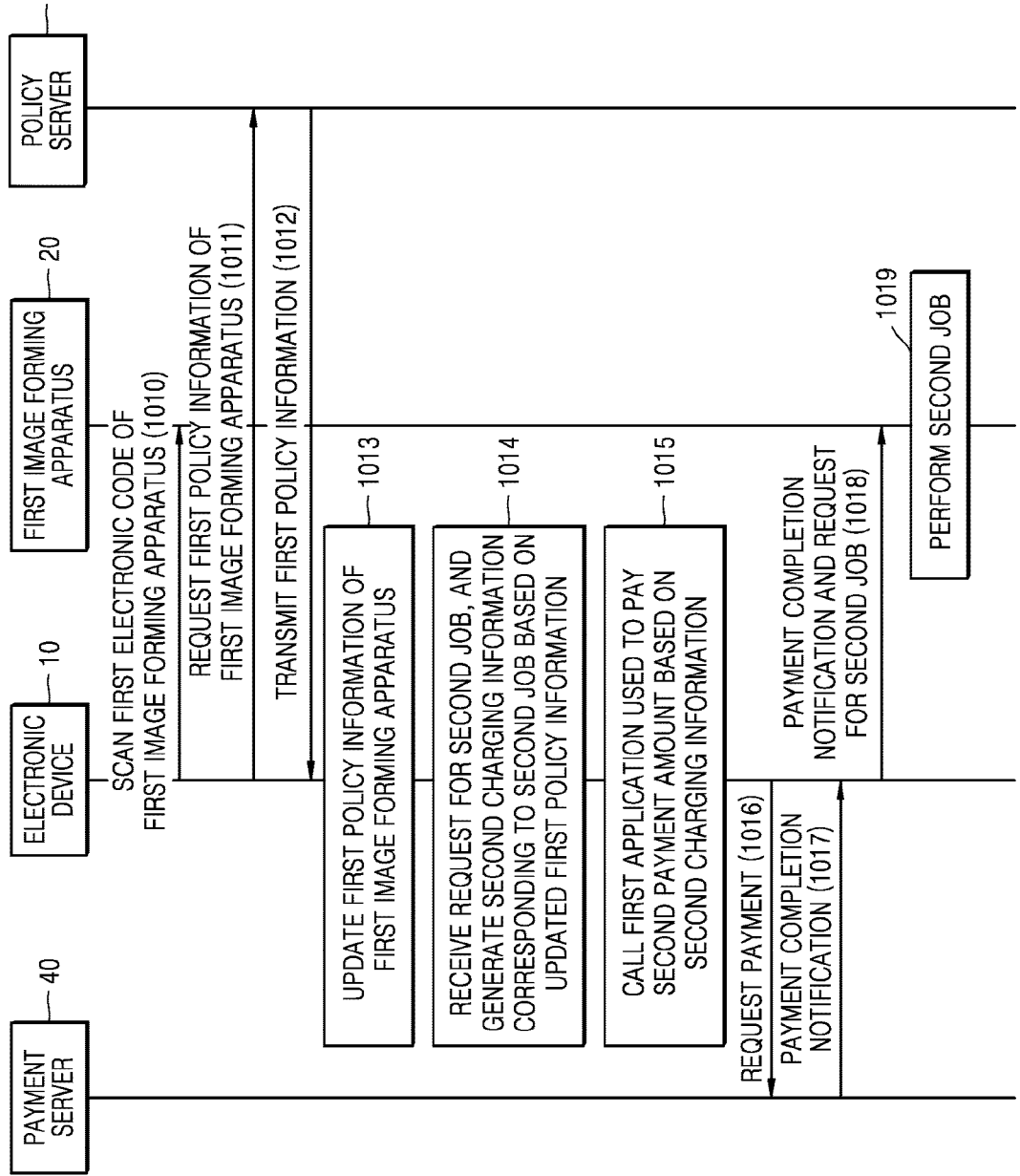

[Fig. 11]
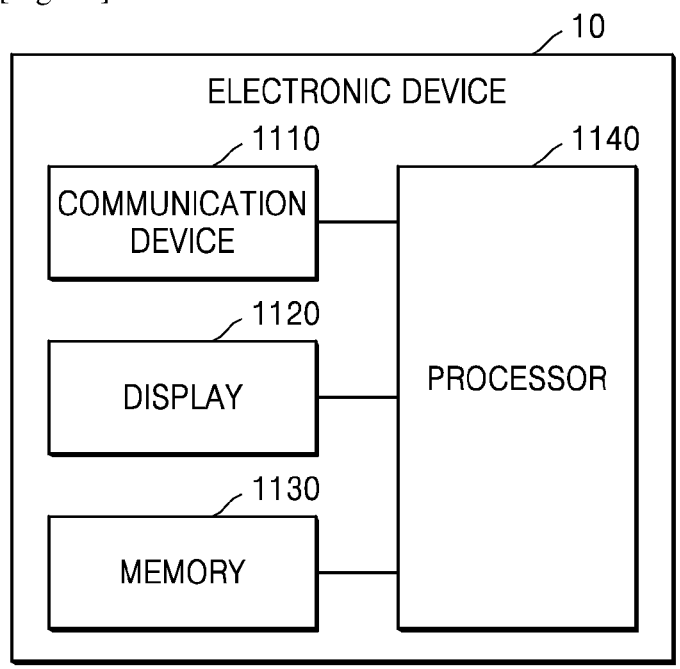

PERFORMING PAYMENT PROCESS ACCORDING TO USE OF IMAGE FORMING APPARATUS IN ELECTRONIC DEVICE

BACKGROUND ART

In an environment in which a fee has to be paid to use an image forming apparatus, it is necessary for a user to make a payment to perform a job such as printing, copying, scanning, faxing, etc. in the image forming apparatus and obtain an output thereof.

In such a case, the user may make the payment directly to a staff member in charge of providing services relating to the image forming apparatus, or may make the payment by using a card reader connected to the image forming apparatus.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a conceptual view for explaining an operation of an electronic device to perform a payment process with respect to a job to be performed by an image forming apparatus, based on policy information of the image forming apparatus, according to an example;

FIG. 2 is a flowchart of an operating method of an electronic device, according to an example;

FIG. 3 is a view for explaining a process in which an electronic device obtains policy information of an image forming apparatus and prepares applications used for a payment process, according to an example;

FIG. 4 is a view for explaining policy information of an image forming apparatus, the policy information being obtained by an electronic device, according to an example;

FIG. 5 is a view for explaining a process in which an electronic device generates charging information with respect to a job to be performed by an image forming apparatus, according to an example;

FIG. 6 is a view for explaining a process in which a payment amount based on charging information is paid in an electronic device, according to an example;

FIG. 7 is a view for explaining a dedicated interface for image forming apparatuses, the interface being provided by an electronic device, according to an example;

FIG. 8 is a view for explaining a process in which an electronic device performs a payment process with respect to a job to be performed by an image forming apparatus, according to an example;

FIG. 9 is a view for explaining a process in which an electronic device performs a payment process with respect to a job to be performed by an image forming apparatus, according to another example;

FIG. 10 is a view for explaining a process in which an electronic device performs a payment process with respect to a job to be performed by an image forming apparatus, according to another example; and FIG. 11 is block diagram of a structure of an electronic device, according to an example.

Throughout the drawings, it should be noted that like reference numbers are used to depict the same or similar elements, features, parts, components, and structures.

MODE FOR THE INVENTION

An "image forming apparatus" may include any type of device capable of performing an image forming job, such as a copier, a printer, a scanner, a fax machine, a multi-function printer (MFP), a display apparatus, or the like. Also, a "scan file" may refer to a file generated by scanning an image by a scanner.

Hereinafter, examples of the present disclosure will be described for one of ordinary skill in the art to execute the examples. However, the disclosure may include various different examples and is not limited to the examples described in this specification.

Hereinafter, a first image forming apparatus 20 can be considered interchangeably with an image forming apparatus 20, a first image forming apparatus 20-1, or a second image forming apparatus 20-2.

FIG. 1 is a conceptual view for explaining an operation of an electronic device to perform a payment process with respect to a job to be performed by an image forming apparatus, based on policy information of the image forming apparatus, according to an example.

Referring to FIG. 1, an electronic device 10 may execute a kiosk application for performing a payment process according to a use of the image forming apparatus 20 in operation 101. For example, the kiosk application may provide information needed for a user to use the image forming apparatus 20 and may provide a user interface for controlling a job of the image forming apparatus 20. Also, the kiosk application may call a payment application for paying a charge occurring due to a use of the image forming apparatus 20.

The electronic device 10 may scan a quick response (QR) code located outside the image forming apparatus 20, in a state in which the kiosk application is executed. In an example, the QR code may be attached to the image forming apparatus 20. The QR code may include policy information including device information of the image forming apparatus 20 and charging criteria information according to a use of the image forming apparatus 20. The electronic device 10 may obtain the policy information of the image forming apparatus 20 from the scanned QR code.

In operation 102, the electronic device 10 may install an application needed to drive the image forming apparatus 20 and perform the payment process according to the use of the image forming apparatus 20, in the electronic device 10, based on the policy information of the image forming apparatus 20. The electronic device 10 may download installation files of the applications that are needed, from an application server 30.

In operation 103, the electronic device 10 may receive a job to be performed by the image forming apparatus 20 and may request a preliminary job with respect to the job, from the image forming apparatus 20. The electronic device 10 may receive a result of driving the preliminary job from the image forming apparatus 20 and may determine a charge based on the policy information.

In operation 104, the electronic device 10 may call a payment application in the electronic device 10 and control the payment application to perform the payment process with respect to the determined charge. Also, the electronic device 10 may transmit charging information to a payment device 15 corresponding to the image forming apparatus 20 and may control the payment device 15 to perform the payment process, in order to pay the determined charge.

In operation 105, a payment server 40 may exchange payment information with the electronic device 10 or the payment device 15. For example, the payment server 40 may transmit payment completion information to the electronic device 10 or the payment device 15 when the payment is completed. In an example, the payment device 15 may transmit the payment completion information to the electronic device 10.

In operation 106, the electronic device 10 may transmit the payment completion information to the image forming apparatus 20.

In operation 107, when the payment is completed, the image forming apparatus 20 may perform the job requested by the electronic device 10.

FIG. 2 is a flowchart of an operating method of an electronic device, according to an example.

Referring to FIG. 2, the electronic device 10 may obtain first policy information including device information of a first image forming apparatus and payment process information in operation 210.

The electronic device 10 may be a mobile device, such as a smartphone, a tablet personal computer (PC), a cellular phone, a personal digital assistant (PDA), a laptop computer, etc. The electronic device 10 may execute an application for controlling a payment process according to a use of an image forming apparatus. The electronic device 10 may scan a first electronic code including the first policy information of the first image forming apparatus. The electronic code may be one of a QR code, a barcode, a color code, a code including letters or signs, or the like. Also, to scan may refer to a method of reading the electronic code.

For example, the electronic device 10 may scan the first electronic code located outside the first image forming apparatus, via a camera of the electronic device 10, in a state in which the application for controlling the payment process is executed. In other examples, the electronic device 10 may read the first electronic code by using a near-field communication (NFC) method, a Bluetooth Low Energy (BLE) method, a QR code method, a barcode method, or the like. The electronic device 10 may obtain the first policy information of the first image forming apparatus, based on the first electronic code. The first electronic code may directly include the first policy information or may include uniform resource locator (URL) information for providing the first policy information.

For example, when the first policy information is included in the first electronic code, the electronic device 10 may extract the first policy information from the read first electronic code. For example, the device information in the first policy information may include identification information of the first image forming apparatus and information about one or more services provided by the first image forming apparatus. For example, the payment process information in the first policy information may include charging criteria information according to a use of the one or more services.

For example, when the first electronic code includes the URL information for providing the first policy information, the electronic device 10 may extract the URL information from the first electronic code that is read, and may obtain the first policy information based on the URL information.

In operation 220, the electronic device 10 may prepare one or more applications for driving the first image forming apparatus or for a payment process with respect to the first image forming apparatus, based on the first policy information. The preparing of the one or more applications for the driving of the first image forming apparatus or for the payment process with respect to the first image forming apparatus may denote installing, in the electronic device 10, the one or more applications needed to perform an operation of requesting, via the electronic device 10, a preliminary job of a job to be performed by the first image forming apparatus, from the first image forming apparatus, a job of making a payment, in the electronic device 10, of a charge with respect to the job to be performed by the first image forming apparatus, and after the payment is completed, an operation of requesting, via the electronic device 10, the first image forming apparatus to perform the job.

The electronic device 10 may identify whether the one or more applications used for the driving of the first image forming apparatus or for the payment process with respect to the first image forming apparatus are installed in the electronic device 10, based on the first policy information. For example, the applications used for the payment process may include a payment application for paying a charged amount. Based on a result of the identification, the electronic device 10 may install an application which is not installed, from among the one or more applications. The electronic device 10 may request an installation file of the application that is not installed from an application server and may download the installation file. The electronic device 10 may execute the installation file of the application and install the application in the electronic device 10.

In operation 230, the electronic device 10 may receive a request for a first job of the first image forming apparatus. The electronic device 10 may generate first charging information corresponding to the first job, based on the first policy information.

The electronic device 10 may display a user interface, via which the one or more services provided by the first image forming apparatus may be selected. Here, the electronic device 10 may display a dedicated interface for image forming apparatuses. For example, the electronic device 10 may display a dedicated interface regardless of model information of the first image forming apparatus. Also, the electronic device 10 may activate and display only an interface corresponding to the one or more services provided by the first image forming apparatus, from the dedicated interface. An example of a dedicated interface for image forming apparatuses will be described with reference to FIG. 7.

The electronic device 10 may receive, via the user interface, the request for the first job based on a first service from among the one or more services. The electronic device 10 may generate first charging information corresponding to the first job, based on the charging criteria information in the first policy information. The electronic device 10 may display the first charging information.

In operation 240, the electronic device 10 may call a first application from among the one or more applications used to pay a first payment amount based on the first charging information.

The electronic device 10 may receive an input to confirm the first payment amount based on the first charging information and an input to select a first payment means of the first payment amount. The electronic device 10 may call the first application corresponding to the first payment means and guide payment of the first payment amount.

In operation 250, the electronic device 10 may control the first image forming apparatus to perform the first job, when the first payment amount is paid via the first application.

The electronic device 10 may receive payment completion information of the first payment amount from a payment server. The electronic device 10 may transmit the payment completion information of the first payment amount and the request for the first job to the first image forming apparatus. The first image forming apparatus may perform the first job.

In an example, the electronic device 10 may receive update information of the first policy information from a server that manages policy information of each of a plurality of image forming apparatuses, based on the first electronic code. The electronic device 10 may update the first policy information based on the update information of the first policy information. Thereafter, the electronic device 10 may generate second charging information of a second job to be performed by the first image forming apparatus, based on the updated first policy information and may perform a payment process of a second payment amount based on the second charging information.

When an image forming apparatus does not include a display to provide a user interface, or the display of the image forming apparatus is too small to provide a desired user interface, a user may obtain a user interface or receive information needed to use the image forming apparatus and may make payment according to a use, by using his/her own electronic device 10.

The electronic device 10 may perform a kiosk function for both providing a user interface of the image forming apparatus and supporting a payment process. Since the electronic device 10 provides the kiosk function, the image forming apparatus may not have to be connected to an additional device providing a kiosk function and may have less restraint in terms of an installation space due to a need for the additional device. Also, since the user may drive the image forming apparatus and make payment via the electronic device 10, the user may individually use the image forming apparatus and may have fewer security problems with respect to exposure of personal information during the payment.

That is, when the user uses the image forming apparatus, the user may more smoothly and conveniently receive the services provided by the image forming apparatus, by using the electronic device 10.

FIG. 3 is a view for explaining a process in which an electronic device obtains policy information of an image forming apparatus and prepares applications used for a payment process, according to an example.

Referring to FIG. 3, it is assumed that there is a first image forming apparatus in a public place, which may be used for a fee. Also, it is assumed that an electronic code including first policy information of the first image forming apparatus is located outside the first image forming apparatus. Here, the first policy information may include device information of the first image forming apparatus and payment process information of the first image forming apparatus.

A user may make payment according to a use of the first image forming apparatus, by using the electronic device 10 of the user. For example, the user may execute an application for controlling a payment process according to the use of the image forming apparatus, via the electronic device 10. The electronic device 10 may display an execution screen to guide scanning of the electronic code including the first policy information of the first image forming apparatus.

As illustrated in an image 310, the electronic device 10 may display a message "please position the QR code to be read inside the square" and an area 311 in which the QR code is to be read. When a first QR code of the first image forming apparatus is read in the area 311, the electronic device 10 may scan the first QR code. The electronic device 10 may obtain the first policy information of the first image forming apparatus, based on information included in the first QR code. An example of a process for obtaining the policy information will be described with reference to FIG. 4.

Referring to an image 320, the electronic device 10 may identify whether one or more applications used for driving the first image forming apparatus or for the payment process are installed in the electronic device 10, based on the first policy information. For example, when a copy job is performed by the first image forming apparatus, a payment amount with respect to the copy job has to be paid. Here, an application for providing a function of paying the payment amount according to the use of the first image forming apparatus may not be installed in the electronic device 10.

As illustrated in the image 320, the electronic device 10 may display a message 321, "An XX pay application has to be installed to make payment. Will you install the application?"

Referring to an image 330, when the electronic device 10 receives an input to select "confirm," the electronic device 10 may display a result of searching for an application file of the XX pay application from an application server providing an installation file of the application. The result of the search may include information, such as a description about the XX pay application, the number of downloads of the XX pay application, an average score (i.e., rating) of the XX pay application, or the like.

When the electronic device 10 receives an input to select "install," the electronic device 10 may download the installation file of the XX pay application from the application server. The electronic device 10 may execute the installation file of the XX pay application and install the XX pay application.

FIG. 4 is a view for explaining policy information of an image forming apparatus, the policy information being obtained by an electronic device, according to an example.

Referring to FIG. 4, the electronic device 10 may scan a first electronic code 401 located outside the first image forming apparatus 20 and may obtain first policy information of the first image forming apparatus 20 from the scanned data.

The first electronic code 401 may include device information of the first image forming apparatus 20 and payment process information of the first image forming apparatus 20. The device information of the first image forming apparatus 20 may include identification information of the first image forming apparatus 20 and information of one or more services provided by the first image forming apparatus 20. The payment process information of the first image forming apparatus 20 may include charging criteria information according to a use of the one or more services.

For example, referring to a block 410, the device information of the first image forming apparatus 20 may include information about whether the first image forming apparatus 20 supports color printing, information about a paper size printable by the first image forming apparatus 20, information about services provided by the first image forming apparatus 20 (e.g., copying, scanning, printing, faxing, etc.), etc.

For example, referring to blocks 420, 430, and 440, the payment process information of the first image forming apparatus 20 may include information about a payment means according to a use of the first image forming apparatus 20, charging criteria information according to a use of the services of the first image forming apparatus 20, information about a transmission destination, to which a result of payment completion of a payment amount with respect to the first image forming apparatus 20 is to be transmitted, etc.

An example of a method performed by the electronic device 10 to obtain the first policy information of the first image forming apparatus 20, whereby the first electronic code 401 located outside the first image forming apparatus 20 is scanned, is described with reference to FIG. 4. In other examples, the electronic device 10 may obtain the first policy information of the first image forming apparatus 20 by using other methods. For example, the electronic device 10 may be connected with the first image forming apparatus 20 and may obtain the first policy information by using an NFC method, a BLE method, or the like. Also, the electronic device 10 may obtain the first policy information of the first image forming apparatus 20 from a policy server managing the first image forming apparatus 20.

FIG. 5 is a view for explaining a process in which an electronic device generates charging information with respect to a job to be performed by an image forming apparatus, according to an example.

Referring to FIG. 5, the electronic device 10 may obtain information about the one or more services provided by the first image forming apparatus 20, from the first policy information of the first image forming apparatus 20. As illustrated in an image 510, the electronic device 10 may display a user interface through which the one or more services provided by the first image forming apparatus 20 may be selected. For example, the electronic device 10 may display icons, via which a print function, a copy function, a scan function, and a fax function, provided by the first image forming apparatus 20, may be selected, respectively. In an example, the electronic device 10 may receive an input to select an icon 511 corresponding to the copy function.

When the electronic device 10 receives the input to select the icon 511 corresponding to the copy function, the electronic device 10 may display a screen for setting subordinate items with respect to the copy function, as illustrated in an image 520. A user may set specific configurations with respect to the subordinate items, on the screen for setting the subordinate items with respect to the copy function.

Referring to an image 530, when the electronic device 10 receives an input to select a "start," the electronic device 10 may scan a document, as a preliminary job of a copy job, according to the subordinate item that is set. The electronic device 10 may display a message notifying that the document is being scanned.

Referring to an image 540, the electronic device 10 may generate first charging information corresponding to the copy job, based on the charging criteria information of the first policy information. As an example, when the copy job is a job of copying three document pages at a size of 100% of an A4 paper size, and charging is set such that one sheet of A4 paper corresponds to one hundred (100) Korean won, the electronic device 10 may determine a payment amount as three hundred (300) Korean won. The electronic device 10 may display a message 541 including information about the payment amount and information about a payment request. When the electronic device 10 receives an input to select "confirm," the electronic device 10 may proceed with the payment process according to the first charging information.

FIG. 6 is a view for explaining a process in which a payment amount based on charging information is paid in an electronic device, according to an example.

Referring to FIG. 6, the electronic device 10 may receive an input to confirm a first payment amount according to first charging information. The electronic device 10 may display a screen for selecting a payment means for paying the first payment amount. The electronic device 10 may receive an input to select a first payment means from among a plurality of payment means. In an example, the electronic device 10 may call a first application corresponding to the first payment means.

For example, as illustrated in an image 610, the electronic device 10 may call an XX pay application, which is a payment means, from among a plurality of applications installed in the electronic device 10. The electronic device 10 may display a message 611 including information about the first payment amount and guide information for guiding the payment. For example, a user may put a finger on a fingerprint sensor or input a payment password, according to the guide information for guiding the payment. When a fingerprint recognized by the fingerprint sensor or the payment password that is input is authenticated, the first payment amount may be paid via the XX pay application.

Referring to an image 620, the electronic device 10 may receive information about payment completion of the first payment amount from a payment server. When the payment of the first payment amount is completed, the electronic device 10 may end the first application corresponding to the first payment means. The electronic device 10 may display a message 621 notifying the payment completion of the first payment amount. The electronic device 10 may transmit, to the first image forming apparatus 20, the information about the payment completion of the first payment amount and a request to perform a job to be performed by the first image forming apparatus 20.

FIG. 7 is a view for explaining a dedicated interface for image forming apparatuses, the interface being provided by an electronic device, according to an example.

Referring to FIG. 7, the electronic device 10 may display a user interface for controlling an image forming apparatus to be used by a user. Here, the user interface may be a dedicated interface for image forming apparatuses, which may be commonly applied to the image forming apparatuses, regardless of model information of an image forming apparatus. For example, a user interface provided to control a first image forming apparatus 20-1 may be a same user interface provided to control a second image forming apparatus 20-2 having model information that is different from that of the first image forming apparatus 20-1. However, when a first service corresponding to a first interface from the dedicated interface of the image forming apparatuses is not provided by the first image forming apparatus 20-1, the electronic device 10 may non-activate the first interface from the dedicated interface of the image forming apparatuses and may activate the remaining interfaces.

Referring to an image 710, the first image forming apparatus 20-1 is assumed to provide a print function, a copy function, a scan function, a fax function, a scan to cloud function, and a scan to file transfer protocol (FTP) function. The electronic device 10 may obtain first policy information of the first image forming apparatus 20-1. The electronic device 10 may identify, based on the first policy information, that services provided by the first image forming apparatus 20-1 include the print function, the copy function, the scan function, the fax function, the scan to cloud function, and the scan to FTP function. The electronic device 10 may activate and display each of an icon 711 for the print function, an icon 712 for the copy function, an icon 713 for the scan function, an icon 714 for the fax function, an icon 715 for the scan to cloud function, and an icon 716 for the scan to FTP function, which are provided via the dedicated interface of the image forming apparatuses.

On the contrary, referring to an image 720, the second image forming apparatus 20-2 is assumed to provide the print function, the copy function, and the scan function, while not providing the fax function, the scan to cloud function, or the scan to FTP function. The electronic device 10 may obtain second policy information of the second image forming apparatus 20-2. The electronic device 10 may identify, based on the second policy information, that services provided by the second image forming apparatus 20-2 include the print function, the copy function, and the scan function.

The electronic device 10 may activate and display only an icon 721 for the print function, an icon 722 for the copy function, and an icon 723 for the scan function, which are provided via the dedicated interface of the image forming apparatuses. Also, the electronic device 10 may display each of an icon 724 for the fax function, an icon 725 for the scan to cloud function, and an icon 726 for the scan to FTP function, which are provided via the dedicated interface of the image forming apparatuses, by non-activating each of the icon 724 for the fax function, the icon 725 for the scan to cloud function, and the icon 726 for the scan to FTP function. For example, the electronic device 10 may display the non-activated icons as dotted lines.

FIG. 8 is a view for explaining a process in which an electronic device performs a payment process with respect to a job to be performed by an image forming apparatus, according to an example.

Referring to FIG. 8, the electronic device 10 may scan a first electronic code of the first image forming apparatus 20 in operation 801. For example, the electronic device 10 may scan the first electronic code, which is located outside the first image forming apparatus 20, via a camera of the electronic device 10. The first electronic code may include the first policy information including the device information of the first image forming apparatus 20 and the payment process information of the first image forming apparatus 20.

In operation 802, the electronic device 10 may obtain the first policy information of the first image forming apparatus 20 by reading the first electronic code. For example, the electronic device 10 may read the first electronic code, and may extract, from the first electronic code, identification information including model information of the first image forming apparatus 20, information about one or more services provided by the first image forming apparatus 20, charging criteria information according to a use of the one or more services, information about an application needed to pay a payment amount determined based on a charging criterion, etc.

In operation 803, the electronic device 10 may prepare, based on the first policy information, one or more applications used for driving the first image forming apparatus 20 or for the payment process. As an example, the electronic device 10 may obtain, based on the first policy information, information about the one or more applications used for the driving of the first image forming apparatus 20 or for the payment process. The electronic device 10 may identify whether the one or more applications are installed in the electronic device 10.

In operation 804, the electronic device 10 may request an installation file of an application which is not installed, from among the one or more applications, from the application server 30.

In operation 805, the electronic device 10 may download the installation file of the application which is not installed, from the application server 30. The electronic device 10 may execute the installation file of the application not installed, and install the application.

In operation 806, the electronic device 10 may receive a request for a first job based on a first service from among the one or more services provided by the first image forming apparatus 20. For example, the electronic device 10 may receive a request to perform a job of copying three A4 document papers as a size of 100% using the first image forming apparatus 20. The electronic device 10 may generate first charging information corresponding to the first job, based on charging criteria information of the first image forming apparatus 20. The electronic device 10 may display the first charging information.

In operation 807, the electronic device 10 may receive an input to confirm a first payment amount based on the first charging information and an input to select a first payment means for the first payment amount. The electronic device 10 may call a first application corresponding to the first payment means and guide the payment of the first payment amount via the first application.

In operation 808, the electronic device 10 may request a payment from a payment server 40, via the first application. In operation 809, when the payment is completed, the electronic device 10 may receive payment completion notification from the payment server 40. In operation 810, the electronic device 10 may transmit the payment completion notification and a request for the first job, to the first image forming apparatus 20. In operation 811, the first image forming apparatus 20 may perform the first job.

FIG. 9 is a view for explaining a process in which an electronic device performs a payment process with respect to a job to be performed by an image forming apparatus, according to another example.

Referring to FIG. 9, operations of the electronic device 10 may correspond to the operations of the electronic device 10 illustrated in FIG. 8. For example, operation 901 of the electronic device 10, illustrated in FIG. 9, may correspond to operation 801 of the electronic device 10, illustrated in FIG. 8. Also, operations 904 through 912 of the electronic device 10, illustrated in FIG. 9, may correspond to operations 802 through 810 of the electronic device 10, illustrated in FIG. 8. Also, operation 913 of the first image forming apparatus 20, illustrated in FIG. 9, may correspond to operation 811 of the first image forming apparatus 20, illustrated in FIG. 8. When describing FIG. 9, descriptions that are the same as those of FIG. 8 will not be given.

The operations of the electronic device 10, illustrated in FIG. 9, may further include an operation of obtaining, from a policy server 50, the first policy information of the first image forming apparatus 20, compared to the operations of the electronic device 10, illustrated in FIG. 8.

In operation 902, the electronic device 10 may request the first policy information of the first image forming apparatus 20 from the policy server 50 configured to manage policy information of each of a plurality of image forming apparatuses. In operation 903, the policy server 50 may transmit the first policy information of the first image forming apparatus 20 to the electronic device 10.

FIG. 10 is a view for explaining a process in which an electronic device performs a payment process with respect to a job to be performed by an image forming apparatus, according to another example.

Referring to FIG. 10, a process is illustrated in which the electronic device 10 performs a payment process with respect to a job to be performed by the first image forming apparatus 20, when the first image forming apparatus 20 is re-used.

In operation 1010, the electronic device 10 may scan a first electronic code of the first image forming apparatus 20.

In operation 1011, the electronic device 10 may request the first policy information of the first image forming apparatus 20 from the policy server 50 configured to manage the policy information of each of the plurality of image forming apparatuses. In operation 1012, the policy server 50 may transmit the first policy information of the first image forming apparatus 20 to the electronic device 10.

In operation 1013, the electronic device 10 may identify whether there is policy information to be updated in the previous first policy information based on the received first policy information, and may update the policy information in the first policy information.

For example, the first policy information received from the policy server 50 may include information about an increased charge per paper in the charging criteria information of the first image forming apparatus 20. The electronic device 10 may update the first policy information by reflecting the information about the increased charge per paper.

In operation 1014, the electronic device 10 may receive a request for a second job based on the first service from among the one or more services provided by the first image forming apparatus 20. The electronic device 10 may generate second charging information corresponding to the second job, based on the charging criteria information of the first image forming apparatus 20. The electronic device 10 may display the second charging information.

In operation 1015, the electronic device 10 may receive an input to confirm a second payment amount based on the second charging information and an input to select a first payment means for the second payment amount. The electronic device 10 may call a first application corresponding to the first payment means and may guide payment of the second payment amount via the first application.

In operation 1016, the electronic device 10 may request a payment from the payment server 40, via the first application. In operation 1017, when the payment is completed, the electronic device 10 may receive payment completion notification from the payment server 40. In operation 1018, the electronic device 10 may transmit the payment completion notification and the request for the second job to the first image forming apparatus 20. In operation 1019, the first image forming apparatus 20 may perform the second job.

FIG. 11 is a block diagram of a structure of an electronic device, according to an example.

Referring to FIG. 11, the electronic device 10 may include a communication device 1110, a display 1120, a memory 1130, and a processor 1140. However, not all illustrated components are essential components. The electronic device 10 may be realized by including more or fewer components that the illustrated components. Hereinafter, examples of the components will be described.

The communication device 1110 may perform communication with external devices. As an example, the communication device 1110 may communicate with the external devices by being connected to a network with wires or wirelessly. Here, the external devices may include an image forming apparatus, a server, a smartphone, a tablet personal computer (PC), a PC, a home appliance, medical equipment, a camera, a wearable device, etc. The communication device 1110 may include a communication module (e.g., a transceiver) supporting at least one of various wired or wireless communication methods. For example, the communication module may have the form of a chipset, the form of a sticker/barcode (e.g. a sticker including an NFC tag) including information needed for communication, or the like. Also, the communication module may include a wireless short-range communication module, a wired communication module, etc.

The communication device 1110 may support, for example, at least one of a wireless local area network (WLAN), wireless fidelity (Wi-Fi), Wi-Fi direct, Bluetooth, universal serial bus (USB), wired LAN, NFC, etc.

The display 1120 may display information, such as a result of an operation of the electronic device 10, a state of the electronic device 10, or the like. Also, the display 1120 may display a user interface for controlling an image forming apparatus.

The memory 1130 may store a program, an application, data, or a file related to the electronic device 10 or the image forming apparatus. The processor 1140 may execute the program stored in the memory 1130, read the data or the file stored in the memory 1130, or store a new file in the memory 1130. The memory 1130 may store a program command, a data file, a data structure, etc., singularly or in a combination thereof. The memory 1130 may store instructions executable by the processor 1140.

For example, the memory 1130 may store instructions to obtain the first policy information including the device information of the first image forming apparatus and the payment process information, instructions to prepare the one or more applications used for driving the first image forming apparatus or for the payment process, based on the first policy information, instructions to receive the request for the first job of the first image forming apparatus and generate the first charging information corresponding to the first job, based on the first policy information, instructions to call the first application from among the one or more applications used to pay the first payment amount based on the first charging information, and instructions to control the first image forming apparatus to perform the first job, when the first payment amount is paid via the first application. The processor 1140 may execute the instructions stored in the memory 1130.

The processor 1140 may control an operation of the electronic device 10 and may include at least one processor, such as a central processing unit (CPU). The processor 1140 may control other components included in the electronic device 10 to perform operations corresponding to user inputs received via the display 1120. The processor 1140 may include at least one specialized processor for each function, or may be a processor in an integrated form.

The processor 1140 may obtain the first policy information including the device information and the payment process information of the first image forming apparatus.

The processor 1140 may execute an application for controlling the payment process due to a use of the image forming apparatus. The processor 1140 may scan the first electronic code including the first policy information of the first image forming apparatus by using a camera in the electronic device 10. The electronic code may be any one of a QR code, a barcode, a color code, a code including letters or signs, or the like. Also, scanning may refer to a method in which an electronic code is read.

As an example, while the processor 1140 executes the application for controlling the payment process, the processor 1140 may scan the first electronic code located outside the first image forming apparatus by using the camera of the electronic device 10. The processor 1140 may obtain the first policy information of the first image forming apparatus based on the first electronic code. The first electronic code may directly include the first policy information or may include URL information for providing the first policy information.

For example, when the first electronic code includes the first policy information, the processor 1140 may extract the first policy information from the read first electronic code. For example, the device information in the first policy information may include identification information of the first image forming apparatus and information about the one or more services provided by the first image forming apparatus. For example, the payment process information of the first policy information may include the charging criteria information according to a use of the one or more services.

For example, when the electronic code includes the URL information for providing the first policy information, the processor 1140 may extract the URL information from the read first electronic code, and obtain the first policy information based on the URL information.

The processor 1140 may prepare the one or more applications used for driving the first image forming apparatus or for the payment process, based on the first policy information. The preparing of the one or more applications used for the driving of the first image forming apparatus or for the payment process may denote installing, in the electronic device 10, the one or more applications needed to perform an operation of requesting, via the electronic device 10, a preliminary job of the job to be performed by the image forming apparatus, from the image forming apparatus, an operation of paying a charge with respect to the job, in the electronic device 10, and an operation of requesting, via the electronic device 10, the job from the image forming apparatus, when the payment is completed.

The processor 1140 may identify whether the one or more applications used for driving the first image forming apparatus or for the payment process are installed in the electronic device 10, based on the first policy information. For example, the applications used for the payment process may include a payment application for paying a payment amount. The processor 1140 may install an application which is not installed, from among the one or more applications, based on a result of the identification. The processor 1140 may request an installation file of the application which is not installed from an application server, via the communication device 1110, and may download the installation file of the application which is not installed from the application server, via the communication device 1110. The processor 1140 may execute the installation file of the application and install the application in the electronic device 10.

The processor 1140 may receive the request for the first job of the first image forming apparatus via the display 1120. The processor 1140 may generate the first charging information corresponding to the first job, based on the first policy information.

The display 1120 may display the user interface on which the one or more services provided by the first image forming apparatus may be selected. Here, the processor 1140 may control the display 1120 to display the dedicated interface of the image forming apparatuses, regardless of model information of the first image forming apparatus. Also, the processor 1140 may control the display 1120 to activate and display only an interface corresponding to the one or more services provided by the first image forming apparatus, from the dedicated interface of the image forming apparatuses.

The display 1120 may receive the request for the first job based on a first service from among the one or more services, via the user interface. The processor 1140 may generate the first charging information corresponding to the first job, based on the charging criteria information in the first policy information. The display 1120 may display the first charging information.

The processor 1140 may call a first application from among the one or more applications used to pay the first payment amount based on the first charging information.

The processor 1140 may receive an input to confirm the first payment amount based on the first charging information and an input to select a first payment means for the first payment amount, via the display 1120. The processor 1140 may call the first application corresponding to the first payment means, and may display a screen for guiding payment of the first payment amount, on the display 1120.

The processor 1140 may control the first image forming apparatus to perform the first job, when the first payment amount is paid via the first application.

The processor 1140 may receive payment completion notification of the first payment amount from the payment server via the communication device 1110. The processor 1140 may transmit the payment completion notification of the first payment amount and the request for the first job, to the first image forming apparatus, via the communication device 1110. The first image forming apparatus may perform the first job.

In an example, the processor 1140 may receive, via the communication device 1110, update information of the first policy information from a server managing policy information of each of a plurality of image forming apparatuses, based on the first electronic code. The processor 1140 may update the first policy information, based on the update information of the first policy information. The processor 1140 may generate the second charging information of the second job to be performed by the image forming apparatus, based on the updated first policy information, and perform a payment process of the second payment amount based on the second charging information.

In an example, the operating methods of the electronic device 10 and the image forming apparatus 20, described above, may be implemented by a non-transitory computer-readable storage medium storing instructions or data executable by a computer or a processor. The operating methods may be written as a program executable on a computer, and may be implemented by a general-purpose digital computer operating the program by using a computer-readable storage medium. The non-transitory computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R, LTHs, BD-REs, a magnetic tape, a floppy disk, a magneto-optical data storage device, an optical data storage device, a hard disk, a sold-state disk (SSD), and any other devices capable of storing instructions or software, related data, a data file, and data structures and providing the instructions or the software, the related data, the data file, and the data structures to a processor or a computer to be executed by the processor or the computer.

Although the examples are described with reference to the drawings, the present disclosure is not limited thereto. It will be understood by one of ordinary skill in the art that various changes and modifications may be made to the described examples. For example, the described methods may be performed and the described apparatuses may operate, in orders that are different from those described, and/or the described systems, structures, devices, circuits, etc. may be combined or integrated in forms different from those described, or replaced or substituted by other components or equivalents.

While one or more examples have been described with reference to the figures, it will be understood by those of ordinary skill in the art that various changes in form and details may be made therein without departing from the spirit and scope as defined by the following claims.

The invention claimed is:

1. An operating method of an electronic device, the operating method comprising:

scanning a first electronic code located at a first image forming apparatus, the first electronic code comprising first policy information of the first image forming apparatus;

obtaining the first policy information based on the scanning of the first electronic code, the first policy information comprising device information of the first image forming apparatus and information of a payment process with respect to the first image forming apparatus;

preparing one or more applications used for driving the first image forming apparatus based on the first policy information;

preparing one or more applications used for the payment process based on the first policy information;

receiving a request for a first job of the first image forming apparatus, and generating, based on the first policy information, first charging information corresponding to the first job;

calling a first application from among the one or more applications used for the payment process to pay a first payment amount based on the first charging information; and when the first payment amount is paid via the first application, calling a second application from among the one or more applications used for driving the first image forming apparatus to control the first image forming apparatus to perform the first job.

2. The operating method of claim 1,
wherein the device information in the first policy information comprises identification information about the first image forming apparatus and information about one or more services provided by the first image forming apparatus, and wherein the information about the payment process in the first policy information comprises charging criteria information corresponding to usage of the one or more services.

3. The operating method of claim 1, wherein the preparing of the one or more applications used for the driving of the first image forming apparatus based on the first policy information, comprises:

identifying whether the one or more applications used for the driving of the first image forming apparatus are installed in the electronic device, based on the first policy information; and based on a result of the identifying, installing an application which is not installed, from among the one or more applications.

4. The operating method of claim 1, wherein the receiving of the request for the first job of the first image forming apparatus, and the generating, based on the first policy information, of the first charging information corresponding to the first job, comprises:

displaying a user interface, via which one or more services provided by the first image forming apparatus are selected;

receiving, via the user interface, the request for the first job based on a first service from among the one or more services; and generating the first charging information corresponding to the first job, based on charging criteria information in the first policy information, and displaying the first charging information.

5. The operating method of claim 4, wherein the displaying of the user interface, via which the one or more services provided by the first image forming apparatus are selected, comprises:

displaying a dedicated interface for image forming apparatuses, regardless of model information of the first image forming apparatus.

6. The operating method of claim 5, wherein the displaying of the dedicated interface for image forming apparatuses comprises:

displaying, from the dedicated interface for image forming apparatuses, only an interface corresponding to the one or more services provided by the first image forming apparatus, by activating the interface.

7. The operating method of claim 1, wherein the calling of the first application from among the one or more applications used for the payment process to pay the first payment amount based on the first charging information comprises:

receiving an input to confirm the first payment amount based on the first charging information and an input to select a first payment means for the first payment amount; and calling the first application corresponding to the first payment means and guiding payment of the first payment amount.

8. The operating method of claim 1, wherein the controlling of the first image forming apparatus to perform the first job when the first payment amount is paid via the first application comprises:

receiving a notification of payment completion of the first payment amount from a payment server; and transmitting, to the first image forming apparatus, the notification of payment completion of the first payment amount and the request for the first job.

9. The operating method of claim 1, further comprising:
receiving, from a server configured to manage policy information of each of a plurality of image forming apparatuses, update information for the first policy information, based on the first electronic code; and updating the first policy information, based on the update information for the first policy information.

10. A non-transitory computer-readable storage medium storing instructions executable by a processor, the non-transitory computer-readable storage medium comprising:

instructions to scan a first electronic code located at a first image forming apparatus, the first electronic code comprising first policy information of the first image forming apparatus;

instructions to obtain the first policy information based on the scanning of the first electronic code, the first policy information comprising device information of the first image forming apparatus, and information of a payment process with respect to the first image forming apparatus;

instructions to prepare one or more applications used for driving the first image forming apparatus based on the first policy information;

instructions to prepare one or more applications used for the payment process based on the first policy information;

instructions to receive a request for a first job of the first image forming apparatus, and generate, based on the first policy information, first charging information corresponding to the first job;

instructions to call a first application from among the one or more applications used for the payment process to pay a first payment amount based on the first charging information; and instructions to call a second application from among the one or more applications used for driving the first image forming apparatus to control the first image forming apparatus to perform the first job, when the first payment amount is paid via the first application.

11. An electronic device comprising:
a display;
a processor; and
a memory storing instructions executable by the processor,
wherein the processor is to execute the instructions to:
scan a first electronic code located at a first image forming apparatus, the first electronic code comprising first policy information of the first image forming apparatus;
obtain the first policy information based on the scanning of the first electronic code, the first policy information comprising device information of a first image forming apparatus and information of a payment process with respect to the first image forming apparatus;
prepare one or more applications used for driving the first image forming apparatus based on the first policy information;
prepare one or more applications used for the payment process based on the first policy information;
receive a request for a first job of the first image forming apparatus, and generate, based on the first policy information, first charging information corresponding to the first job;
call a first application from among the one or more applications used for the payment process to pay a first payment amount based on the first charging information; and
when the first payment amount is paid via the first application, call a second application from among the one or more applications used for driving the first image forming apparatus to control the first image forming apparatus to perform the first job.

12. The electronic device of claim 11, wherein the processor is to execute the instructions to:
identify whether the one or more applications used for the driving of the first image forming apparatus are installed in the electronic device, based on the first policy information; and
based on a result of the identification, install an application which is not installed, from among the one or more applications.

13. The electronic device of claim 11, wherein the processor is to execute the instructions to:
display a user interface, via which one or more services provided by the first image forming apparatus are selected;
receive, via the user interface, the request for the first job based on a first service from among the one or more services; and
generate the first charging information corresponding to the first job, based on charging criteria information in the first policy information, and display the first charging information.

14. The electronic device of claim 13, wherein the processor is to execute the instructions to display a dedicated interface for image forming apparatuses, regardless of model information of the first image forming apparatus.

15. The electronic device of claim 14, wherein the processor is to execute the instructions to display, from the dedicated interface for image forming apparatuses, only an interface corresponding to the one or more services provided by the first image forming apparatus, by activating the interface.

16. The electronic device of claim 11, wherein the processor is to execute the instructions to:
receive an input to confirm the first payment amount based on the first charging information and an input to select a first payment means for the first payment amount; and
call the first application corresponding to the first payment means and guide payment of the first payment amount.

17. The electronic device of claim 11, wherein the processor is to execute the instructions to:
identify whether the one or more applications used for the payment process are installed in the electronic device based on the first policy information; and
based on a result of the identification, install an application which is not installed, from among the one or more applications.

18. The electronic device of claim 11,
wherein the device information in the first policy information comprises identification information about the first image forming apparatus and information about one or more services provided by the first image forming apparatus, and
wherein the information about the payment process in the first policy information comprises charging criteria information corresponding to usage of the one or more services.

19. The electronic device of claim 11, wherein the processor is to execute the instructions to:
receive, from a server to manage policy information of each of a plurality of image forming apparatuses, update information for the first policy information, based on the first electronic code; and
update the first policy information, based on the update information for the first policy information.

20. The operating method of claim 1, wherein the preparing of the one or more applications used for the payment process based on the first policy information, comprises:
identifying whether the one or more applications used for the payment process are installed in the electronic device, based on the first policy information; and
based on a result of the identifying, installing an application which is not installed, from among the one or more applications.

* * * * *